United States Patent [19]
Wilson et al.

[11] Patent Number: 6,064,928
[45] Date of Patent: May 16, 2000

[54] MECHANICAL SENSOR DIAGNOSTIC METHOD AND SYSTEM

[75] Inventors: David S. Wilson, Farmington, Mich.; Michael R. Sewell, Chatham, Canada

[73] Assignee: Automation Systems Laboratory, Inc., Farmington Hills, Mich.

[21] Appl. No.: 09/065,370

[22] Filed: Apr. 23, 1998

Related U.S. Application Data

[60] Provisional application No. 60/043,981, Apr. 24, 1997.

[51] Int. Cl.⁷ .......................... G01M 19/00; G06F 19/00
[52] U.S. Cl. .............................. 701/34; 701/45; 280/735; 280/734; 340/438
[58] Field of Search ................. 701/34, 45; 280/735, 280/734; 340/438

[56] References Cited

U.S. PATENT DOCUMENTS

| | | | |
|---|---|---|---|
| 4,827,091 | 5/1989 | Behr | 200/61.45 M |
| 4,873,452 | 10/1989 | Morota et al. | 307/10.1 |
| 4,914,263 | 4/1990 | Behr | 200/61.45 M |
| 4,922,065 | 5/1990 | Behr et al. | 200/61.45 M |
| 4,933,515 | 6/1990 | Behr et al. | 200/61.45 M |
| 4,958,851 | 9/1990 | Behr et al. | 280/735 |
| 4,999,775 | 3/1991 | Muraoka | 701/34 |
| 5,136,275 | 8/1992 | Madau et al. | 340/438 |
| 5,149,925 | 9/1992 | Behr et al. | 200/61.45 M |
| 5,163,325 | 11/1992 | White et al. | 73/517 R |
| 5,229,943 | 7/1993 | Eigler et al. | 701/46 |
| 5,287,724 | 2/1994 | White et al. | 73/1 D |
| 5,293,153 | 3/1994 | Rochette et al. | 340/438 |
| 5,369,231 | 11/1994 | Anderson et al. | 200/61.45 M |
| 5,369,305 | 11/1994 | Duhan et al. | 307/10.1 |
| 5,461,566 | 10/1995 | Musser | 364/424.05 |
| 5,496,979 | 3/1996 | Behr | 200/61.45 M |
| 5,544,716 | 8/1996 | White | 180/274 |
| 5,614,700 | 3/1997 | Moss et al. | 200/61.45 M |
| 5,734,318 | 3/1998 | Nitschke et al. | 340/438 |
| 5,779,264 | 7/1998 | Mersseman et al. | 280/735 |
| 5,826,902 | 10/1998 | Foo et al. | 280/735 |

*Primary Examiner*—William A. Cuchlinski, Jr.
*Assistant Examiner*—Olga Hernandez
*Attorney, Agent, or Firm*—Lyons, P.C.

[57] ABSTRACT

A system 10 and method for performing diagnostic testing on a mechanical safing sensor used in vehicular safety restraint and vehicle crash discrimination systems includes an accelerometer 12 having an output 14 representative of acceleration, and a processor 20 having an first input 22 responsive to the accelerometer output 14 and a second input 24 responsive to a binary output 18 generated by a mechanical safing sensor 16. The system utilizes normally occurring deceleration events to reliably diagnose safing sensor malfunctions while requiring minimal additional hardware over conventional vehicle safety restraint systems.

7 Claims, 1 Drawing Sheet

MECHANICAL SENSOR DIAGNOSTIC METHOD AND SYSTEM

CROSS-REFERENCE TO RELATED APPLICATIONS

The instant application claims the benefit of U.S. Provisional Application Ser. No. 60/043,981 filed on Apr. 24, 1997.

TECHNICAL ART

The present invention relates to a system and method for performing diagnostic testing on mechanical sensors used to measure deceleration for vehicular safety restraint systems and vehicle crash discrimination and airbag deployment control systems.

BACKGROUND OF THE INVENTION

A conventional mechanical crash detection sensor, sometimes called a safing sensor, typically consists of an acceleration sensing device that biases closed a set of normally open mechanical switch contacts at a predetermined rate of deceleration, thereby completing an electrical circuit. Alternatively, the sensor may switch on a binary output using a conventional electronic switching circuit. Examples of such sensor arrangements may be found in U.S. Pat. No. 4,995,639 to Breed.

A safing sensor is employed in an airbag inflation circuit in an analogous fashion to the safety mechanism of a firearm. The safing sensor, upon detecting a predetermined threshold level of deceleration just below that of an automobile crash event, switches on a binary output or closes a set of normally open switch contacts. The output or switch contacts are interposed in series with an airbag inflator circuit such that the inflator circuit is armed (ready to fire) when the output is on or the switch contacts closed. The inflator circuit typically one or more mechanical or electronic crash discrimination sensors in conjunction with at least one safing sensor to determine the precise moment to initiate airbag inflation.

Therefore, a mechanical safing sensor will switch on many times during its normal service life under conditions that are normally insufficient to fire a crash discrimination sensor. Due to the criticality of airbag deployment in the event of a crash, it is generally desirable to be able to diagnose mechanical sensors for non-functional conditions. These conditions may include mechanical switch contacts being "stuck open", or "stuck closed", corroded contacts which may cause high resistance in an airbag inflation circuit, or an inoperative binary output.

Previously, only specially designed mechanical sensors have provided the diagnostic capability to detect "stuck open" or "stuck closed" contacts. More specifically, diagnostic capabilities have previously been achieved for "stuck open" contact situations by using an electromagnetic coil, a magnet, and several electronic components to supply current to the coil. When electrical current is applied to the coil, the electromagnet biases the mechanical contacts closed thereby causing a change in resistance as measured across the contacts. By monitoring the operation of the contacts during the operation of the testing circuit, proper operation of the sensor may be detected.

However, while such a sensor testing arrangement provides diagnostic capability, it is a very costly method of gathering information about the operational status of a mechanical sensor, both in the requisite number of components and the relative complexity of assembly. Furthermore, these known diagnostic mechanical sensors also suffer from the disadvantage that the testing circuit may perform a self-test at an inopportune time and thereby initiate inadvertent inflation of the airbag.

SUMMARY OF THE INVENTION

By using a conventional accelerometer having a continuous or analog output in conjunction with a conventional computer processor, the present invention can diagnose a mechanical safing sensor to determine if its binary output is functional. An example of such an accelerometer may be found in U.S. Pat. No. 5,149,925 to Behr et al. By monitoring the acceleration measurements provided by the accelerometer it may be determined when the mechanical sensor should switch. A mechanical sensor will switch multiple times during the normal service life of an automobile. Normally occurring events such as driving over large potholes or curbs, or hard deceleration on uneven road surfaces may cause a mechanical sensor's actuation threshold limit to be reached thereby generating the binary output.

In the preferred embodiment of the present invention, the processor monitors the mechanical sensor's switch operation by detecting changes in electrical resistance across the sensor's switch contacts or by providing a binary input responsive to the sensor's binary output. The processor also monitors a conventional electronic accelerometer to identify non-crash collisions which exceed the mechanical sensor's actuation threshold. By comparing the timing of the output generated by the sensor with the timing of the accelerometer signal indicating that the sensor's threshold has been exceeded, it may be determined whether the sensor is functioning properly.

Therefore, one object of the present invention is to provide a system and method for diagnosing the operation of a mechanical safing sensor that utilizes normally occurring events that cause the sensor to actuate to determine whether the sensor is operating properly.

It is a further object of the present invention to provide a system and method for diagnosing the operation of a mechanical safing sensor that utilizes components which are inherently present in conventional vehicle crash discrimination and airbag control systems. Since most conventional vehicle airbag control systems employ at least one accelerometer, the only additional cost of the present invention over conventional systems is the initial cost of providing suitable programming for the processor.

DETAILED DESCRIPTION OF THE PREFERRED EMBODIMENTS

Figure 1:
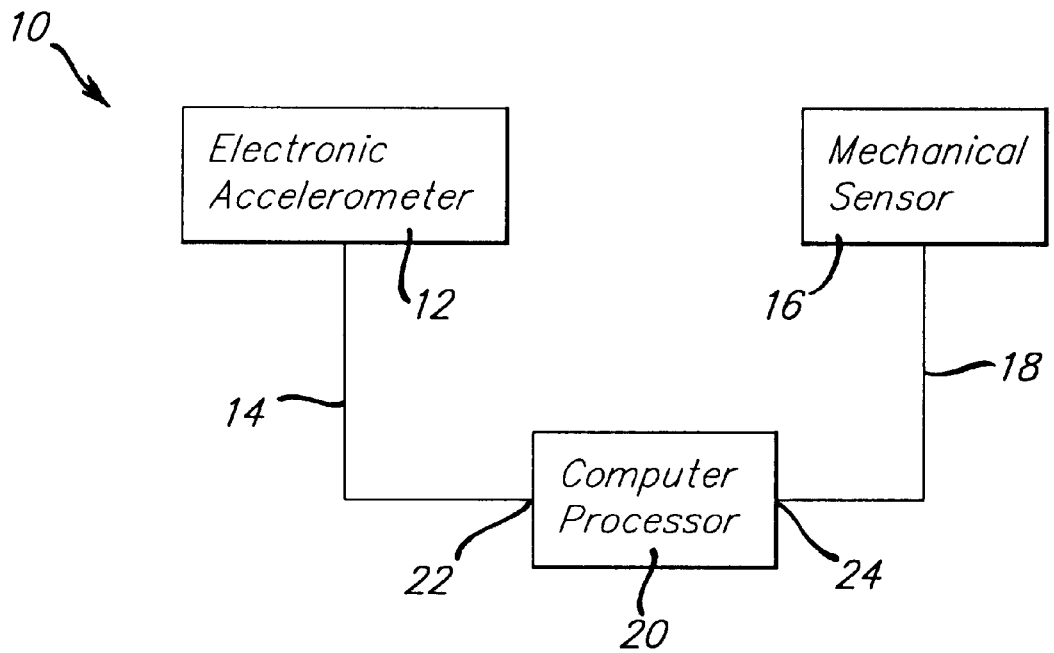

Referring to FIG. 1, a diagnostic system and method 10 for a mechanical sensor employed in a vehicle crash discrimination system, in accordance with a preferred constructed embodiment of the present invention, provides at least one electronic accelerometer sensor 12 having a continuous output 14 representative of the amount of acceleration or deceleration acting on the vehicle, and at least one mechanical type sensor 16 having a binary output 18 responsive to a predetermined level of deceleration. An example of such a mechanical sensor is a conventional low threshold safing sensor. The binary output 18 of the mechanical sensor 16 is generated when the sensor actuation threshold is met or exceeded.

A computer processor 20 is provided with at least one input 22 responsive to the accelerometer continuous output 14 and at least one binary input 24 responsive to the mechanical sensor binary output 18. In an alternative embodiment of the invention the processor 20 may be provided with multiple inputs for receiving output signals from redundant accelerometers thereby allowing for signal averaging.

As is well known to one having ordinary skill in the art, the analog output 14 of the accelerometer 12 can provide a great deal of information regarding the detected acceleration or deceleration of the vehicle and the operational status of the sensor. Malfunctions in these sensors are readily detectable. Conversely, the mechanical sensor 16 will only provide an output signal when its predetermined actuation threshold is exceeded. Thus, the mechanical sensor 16 by itself provides no information about whether it is functioning properly until it is actually required to function.

Thus, in accordance with the present invention, the accelerometer output 14 is analyzed by the processor 20 and used as a gauge to determine whether the mechanical sensor 16 should have generated binary output signal 18 for a given level of deceleration. On average, the mechanical sensor 16 will close several hundred times throughout the life of a vehicle under "normal" operating conditions. Conditions that could cause a malfunctioning sensor, such as a safing sensor 16 having a low actuation threshold, are potholes, curbs, hard breaking on washboard surfaces, etc.

In the preferred embodiment of the present invention the processor 20 is provided with the design actuation threshold data for the mechanical sensor 16. The design actuation threshold is the deceleration level at which the sensor is designed to actuate. This data is typically given in terms of the rate of change of velocity for given discrete time intervals. The processor 20 then integrates the accelerometer output 14 over time and compares the resultant velocity changes at discrete time intervals with the maximum threshold changes of the mechanical sensor 16. For example, a comparison may be made by the processor 20 between the actual velocity change over time as measured by the accelerometer 12 and the actuation threshold of the mechanical sensor 16 at 10, 25, and 40 millisecond time intervals.

The processor 20 is further provided with design maximum actuation time data for the mechanical sensor 16. By providing the proper design threshold actuation data and actuation time data of the mechanical sensor 16 to the processor 20, the output 14 of the accelerometer 12 can be used to determine if the mechanical sensor 16 should have actuated within a given time period. By comparing the actual time of sensor 16 actuation with the time that the sensor 16 should have actuated based on the output 14 of the accelerometer 12 and the maximum actuation time, degradation of the actuation time of the sensor 16 may be detected.

Deceleration, as measured by the accelerometer 12, is compared in the processor 20 to the design actuation threshold of the mechanical sensor 16. When the actuation threshold is met or exceeded, the processor 20 monitors its binary input 24 to determine when the sensor binary output 18 is generated. If the processor 20 does not detect the binary input 24 within the maximum sensor actuation time, a first data bit is set in the processor 20 to indicate that the sensor 16 did not actuate within the actuation time as provided by the sensor 16 design criteria. The first data bit indicates that the sensor 16 is not accurately determining deceleration or that the sensor binary output 18 is "stuck off".

Figure 2:
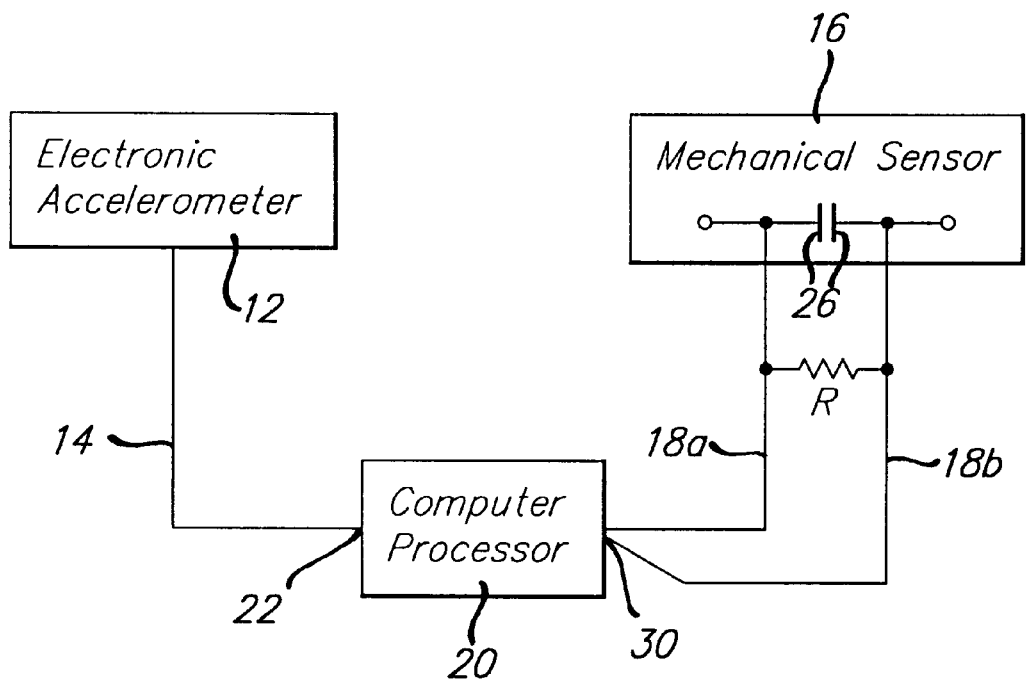

Alternatively, the processor 20 will set a second data bit when the binary input 24 is detected and the level of deceleration required to actuate the sensor 16 has not been detected by the analog input 22 for a predetermined period of time. The second data bit indicates that the sensor binary output 18 is "stuck on", or that the sensor 16 is not accurately determining deceleration as measured by the accelerometer 12. Referring to FIG. 2 and in accordance with an alternative embodiment of the instant invention, mechanical sensor 16 is provided with a pair of normally open switch contacts 26 in place of binary output 18. The switch contacts 26 are biased closed by the sensor 16 when its actuation threshold has been met or exceeded. Electrically conductive leads 18(*a*) and 18(*b*) are connected in series with the switch contacts 26. A resistor of predetermined value, R, may be connected in parallel across leads 18(*a*) and 18(*b*) to provide a predetermined amount of resistance when the switch contacts 26 are open. Processor 20 is provided with a means for measuring resistance in an electrical circuit 30 that is connected to the leads 18(*a*) and 18(*b*).

In order to monitor the mechanical sensor 16 for a proper switch closure (binary output) across leads 18(*a*) and 18(*b*), the resistance across the sensor leads 18 can be monitored by the processor means 20. For example, a 1000 ohm resistor R is connected across the leads 18(*a*) and 18(*b*) and in parallel with the switch contacts 26 as shown in FIG. 2. Upon actuation of the safing sensor 16, the corresponding resistance across the switch contacts 26 measured by means 20 should decrease from 1000 ohms to a predetermined minimum resistance. The minimum resistance measured is the amount of resistance inherently present in the conductors in the circuit path of the sensor means 20 when the circuit is closed. This resistance is typically in the range of 25–90 milliohms. If a decrease in resistance is not detected by means 20 within the proper sensor actuation time, a sensor 16 malfunction is indicated and the processor 20 sets a first data bit indicating that the contacts are "stuck off" or "stuck open" or that the sensor 16 is not accurately determining deceleration.

Alternatively, if the processor means 30 measures resistance across the contacts 26 that is less than a predetermined minimum amount of resistance indicating proper contact 26 closure and the accelerometer output 14 does not indicate a level of deceleration sufficient to actuate the sensor 16, the processor 20 sets a second data bit indicating that the contacts 26 are "stuck on" or "stuck closed" or that the sensor 16 is not accurately measuring deceleration.

When the accelerometer output 14 indicates a level of deceleration sufficient to actuate the sensor 16 and the processor means 20 measures resistance across the switch contacts 26 that is less than the predetermined amount of resistance across leads 18(*a*) and 18(*b*) but greater than a predetermined minimum amount of resistance indicating proper contact 26 closure, the processor 20 sets a third data bit indicative of high resistance across the switch contacts 26. High resistance across the contacts 26 may indicate corroded contacts or contacts that are misaligned when closed.

The data bits set by the processor 20 may be used to generate a signal for an alarm or indicator lamp on the vehicle dashboard to indicate an airbag system malfunction or fault. Additionally, the data bits may be used to provide fault indication to an automotive diagnostics computer in communication with processor 20, as commonly used in service facilities.

Therefore, the present invention allows a conventional processor 20 to perform diagnostics on a mechanical sensor 16 during any non-crash deceleration that exceeds the threshold limit of the mechanical sensor 16. The diagnostic system is initiated as a result of the same events that normally cause sensor wear, like ruts and potholes, which in turn cause sensor performance to degrade or malfunction. Additionally, the mechanical sensor 16 is continuously monitored to determine whether it is actuating below it's design actuation threshold. The present invention utilizes the events that cause wear and damage to the sensor to detect any sensor failures.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A system for diagnosing the operation of a sensor used in a vehicle crash discrimination system having an output responsive to a predetermined amount of deceleration comprising:

a sensor means for measuring deceleration having a continuous output signal representative of the amount of deceleration acting on said vehicle and, a processor having a first input means responsive to the output of said sensor to determine when the output is generated, a second input means responsive to the continuous output signal of said sensor means, and means for performing signal analysis on the continuous output signal to determine whether the continuous output signal is indicative of an amount of deceleration sufficient to generate the output of said sensor.

2. A system according to claim 1 wherein the output of said sensor comprises a pair of normally open switch contacts and said input means responsive to the output of said sensor comprises a means for measuring electrical resistance across said switch contacts.

3. A processor-implemented method of diagnosing the operation of a sensor having an output generated by a predetermined amount of deceleration, said processor having a first input responsive to the output of said sensor and having a second input responsive to a continuous output of an accelerometer comprising the steps of:

providing said processor with actuation threshold data and actuation time data for said sensor;

comparing said sensor actuation threshold data with the continuous output of said accelerometer as measured by the second input of said processor to determine when said sensor actuation threshold is met or exceeded;

monitoring the first input of said processor to detect when the output of said sensor is generated;

measuring the elapsed time between each instance of the continuous output of said accelerometer meeting or exceeding said sensor actuation threshold, and setting a first data bit in said processor when the output of said sensor is not detected within a temporal period exceeding said sensor actuation time as measured from each instance of the continuous output of said accelerometer meeting or exceeding said sensor actuation threshold, wherein said first data bit indicates a failure of said sensor to generate the output in response to said predetermined amount of deceleration.

4. The method of claim 3 further comprising:

setting a second data bit in said processor when the output of said sensor is detected by the second input of said processor and the continuous output of said accelerometer does not meet or exceed said sensor actuation threshold for a predetermined time period, wherein said second data bit indicates a failure of said sensor to deactivate the output or a low sensor actuation threshold.

5. A processor-implemented method of diagnosing the operation of a sensor having an output comprised of a pair of normally open switch contacts biased closed by a predetermined amount of deceleration, said processor having a first input means for determining the resistance of an electrical circuit connected to the switch contacts of said sensor and further having a second input responsive to a continuous output of an accelerometer, comprising the steps of:

providing said processor with actuation threshold data and actuation time data for said sensor;

comparing said sensor actuation threshold data with the continuous output of said accelerometer as measured by the second input of said processor to determine when said sensor actuation threshold is met or exceeded;

measuring the resistance across the switch contacts wherein a decrease in the resistance across the contacts to a predetermined minimum indicates a closure of the switch contacts by said sensor;

measuring the elapsed time between each instance of the continuous output of said accelerometer meeting or exceeding said sensor actuation threshold and;

setting a first data bit in said processor when the resistance measured across the switch contacts does not decrease to a predetermined minimum resistance within a temporal period exceeding said sensor actuation time as measured from each instance of the continuous output of said accelerometer meeting or exceeding said sensor actuation threshold, wherein said first data bit indicates a failure of said sensor to close the switch contacts within said sensor actuation time.

6. The method of claim 5 further comprising:

setting a second data bit in said processor when the resistance measured across the switch contacts remains at or below a predetermined minimum resistance and the continuous output of said accelerometer does not exceed said sensor actuation threshold for a predetermined time period, wherein said second data bit indicates a failure of said sensor to open the switch contacts or a low sensor actuation threshold.

7. The method of claim 6 further comprising:

setting a third data bit in said processor when the resistance measured across the switch contacts remains below the resistance as measured when the switch contacts are in an open position and above a predetermined minimum resistance for a temporal period exceeding said sensor actuation time as measured from each instance of the continuous output of said accelerometer meeting or exceeding said sensor actuation threshold, wherein said third data bit indicates high resistance across the switch contacts.

* * * * *